United States Patent [19]

Marschall et al.

[11] Patent Number: 5,742,559
[45] Date of Patent: Apr. 21, 1998

[54] HYDROPHONE AND ARRAY THEREOF

[75] Inventors: Richard A. Marschall; Debra L. Marschall, both of Penrith, Australia

[73] Assignee: Marschall Acoustics Instruments Pty. Ltd., New South Wales, Australia

[21] Appl. No.: 762,755

[22] Filed: Dec. 10, 1996

[30] Foreign Application Priority Data

Dec. 12, 1995 [AU] Australia .................. PN7109

[51] Int. Cl.⁶ .................................. H04R 23/00
[52] U.S. Cl. .................. 367/20; 367/154; 367/159; 181/110
[58] Field of Search ................ 367/20, 154, 159; 181/110; 310/337

[56] References Cited

U.S. PATENT DOCUMENTS

| | | |
|---|---|---|
| 4,486,869 | 12/1984 | Carter ........................... 367/154 |
| 4,509,151 | 4/1985 | Anderson ....................... 367/118 |
| 4,786,837 | 11/1988 | Kalnin et al. .................. 310/364 |
| 4,920,523 | 4/1990 | Kruka et al. ................... 367/188 |
| 5,204,843 | 4/1993 | Beauducel ...................... 367/20 |
| 5,550,791 | 8/1996 | Peloquin ........................ 367/153 |

*Primary Examiner*—J. Woodrow Eldred
*Attorney, Agent, or Firm*—Jordan and Hamburg

[57] ABSTRACT

A piezoelectric transducer hydrophone comprised of a plurality of longitudinal segments is described. The longitudinal segments allow the transducers to be readily attached to cables to form hydrophone arrays. Should a particular transducer become faulty following testing or use of the hydrophone array, the longitudinal segments allow the transducer to be accessed without the need to remove all of the acoustic transducers on the cable between the end of the cable and the one that is faulty.

29 Claims, 2 Drawing Sheets

5,742,559

HYDROPHONE AND ARRAY THEREOF

BACKGROUND OF THE INVENTION

The present invention relates generally to a piezoelectric transducer hydrophone and to a hydrophone array for use as a towed sensing device in seismic exploration and like applications.

Piezoelectric transducers have a wide range of applications including, for example, being placed in arrays for use in towed sensing devices. Piezoelectric transducers can employ ceramic materials such as barium titanate or lead zirconate titanate (PZT) or plastic materials such as polyvinylidene fluoride (PVDF) or piezo-rubber composites.

Towed arrays of piezoelectric transducers are typically fabricated by mounting a plurality of transducers over a cable. Given that the cable can be over one kilometer long, the placement of transducers over the cable can require significant factory floor space and is a relatively expensive procedure. If, during testing or after use of a towed array, one of the acoustic transducers requires repair or replacement, it is necessary to remove the transducers between the end of the cable and the faulty transducer so as to allow access to the faulty transducer.

It would be desirable to have a transducer arrangement that allowed ready manufacture and access for repair.

SUMMARY OF THE INVENTION

In a first aspect, the present invention consists in an acoustic transducer comprising a tube having a longitudinal axis, the tube being fabricated from a plurality of longitudinal segments, and the segments being comprised at least in part of a piezoelectric plastics material.

In a preferred embodiment, the tube is substantially cylindrical. The tube can also be elliptical in cross-section. The tube can be fabricated from two portions, or a greater number of segments.

The piezoelectric plastics material can comprise one or a plurality of piezoelectric polymers films, such as polyvinylidene fluoride (PVDF) or piezo-rubber composites. In one embodiment, the piezoelectric plastics material can be replaced by an active polarized piezoelectric ceramic material such as barium titanate or lead zirconate titanate (PZT).

The inner and outer faces of the piezoelectric segments each have an electrically conductive material covering at least a part of each face and thereby providing an electrode for each face. Each electrode could comprise a coating of metal such as silver, gold or aluminium or an intrinsically or extrinsically conductive polymer. Electrical connection to the faces is preferably facilitated by conductive leads attached to the electrodes by a conductive epoxy or adhesive metallic tape.

The piezoelectric segments are preferably arranged such that electrical interconnection is provided between the respective inner faces of the segments and the respective outer faces of the segments. In one embodiment, the segments may be in an abutting arrangement with short electrical leads or conductive tape providing the electrical connection between the respective faces of the segments.

The acoustic transducer or a plurality of such transducers are preferably arranged to be mounted around a cable to form a hydrophone array. The transducers are preferably mounted symmetrically around the cable. In operation, the hydrophone array can be used as a towed, vertical, or seismic downhole array. It is particularly suited to a towed sensor arrangement behind a geophysical survey vessel. The cable in such an application must provide towing forces for the acoustic transducers and desirably the electrical and other signal connections necessary between each acoustic transducer and the associated data processing and analysis equipment which is normally located in the vessel towing the array. Signal transmission through the cable may be through standard bearers or through the use of optical fibers.

When mounted on a cable, a strain shielding element is preferably provided on the cable for each acoustic transducer that substantially shields the transducer from stresses generated in the cable. The strain shielding element preferably consists of a cylidrical member that fits snugly around the cable. The strain shielding member is also preferably fabricated from segments extending longitudinally of the member. The segments are preferably fabricated from a stiff material such as a metal, alloy or carbon fiber.

The piezoelectric segments are preferably held in position by one or a plurality of fasteners that wrap around the tube. Other fastening arrangements could, however, be employed.

The transducers when mounted on a cable are preferably surrounded by a housing having a suitable hydrodynamic shape. The housing can be of substantially constant width or have a non-constant width. An example of one housing that can be employed is described in the present inventor's U.S. Pat. No. 4,958,329, the described of which is incorporated by reference.

The entire arrangement can also be encased in a further outer housing that waterproofs and protects the transducer. The outer housing would preferably be fabricated from a soft material such as polyvinyl chloride (PVC) or polyurethane.

In a further aspect, the present invention provides a method of fabricating an acoustic transducer comprising the step of forming a tube of piezoelectric material from a plurality of longitudinal segments.

In another aspect, the present invention provides a method of fabricating an array of acoustic transducers including the step of mounting a plurality of acoustic transducers to a cable, the step of mounting each acoustic transducer to the cable comprising the step of forming a tube of piezoelectric material from a plurality of longitudinal segments.

BRIEF DESCRIPTION OF THE DRAWINGS

Hereinafter by way of example only, preferred embodiments of the invention are described with reference to the accompanying drawings, in which.

DETAILED DESCRIPTION OF THE PRESENT INVENTION

Figure 1:
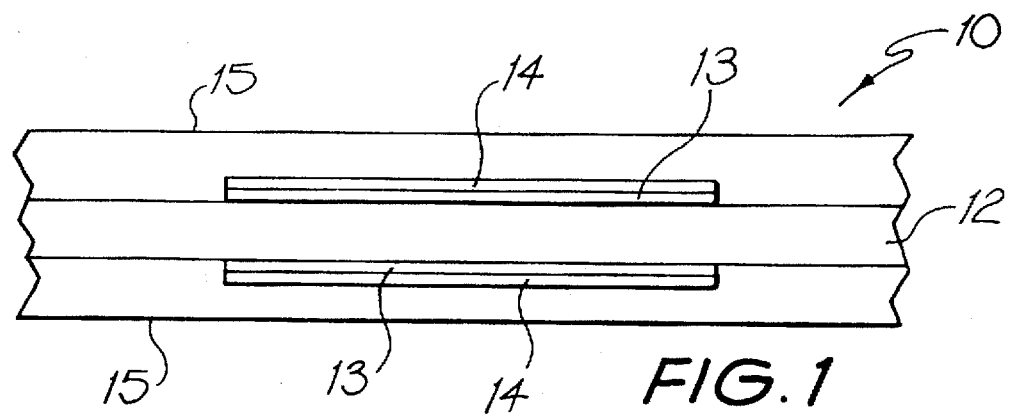
FIG. 1 is a simplified vertical cross-sectional view of one embodiment of an acoustic transducer according to the present invention.
Figure 2:
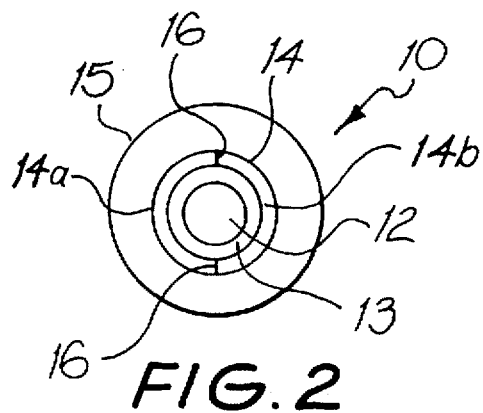
FIG. 2 is a horizontal cross-sectional view of the transducer of FIG. 1.

One embodiment of an acoustic transducer according to the present invention is depicted generally as 10 in FIGS. 1 and 2.

The acoustic transducer 10 is connected to a towing cable 12. The transducer 10 comprises a cylindrical strain shielding element 13 and a cylindrical tube of piezoelectrical material 14 arranged to operate in hydrostatic mode. While the tube of piezoelectric material 14 is cylindrical in the depicted embodiment and so is circular in cross-section, a tube that is elliptical in cross-section can also readily be envisaged. The strain shielding element 13 is made of a stiff material such as carbon fibre and acts to substantially shield the piezoelectric material 14 from stresses generated in the cable 12 during use. The strain shielding material 13 can also be fabricated from other suitable materials including metals and alloys. The transducer 10 is also enclosed within a water-tight plastic overmold 15.

As is best depicted in FIG. 2, the cylindrical tube of piezoelectric material 14 is comprised of two hemicylinders 14a, 14b in abutting arrangement. Such an arrangement facilitates mounting of the tube 14 to the cable 12 in that rather than having to slide the tube 14 along the cable 12 to the desired position, the two hemicylinders 14a, 14b are simply brought together at the desired position around the cable 12 and fixed in place. While hemicylindrical portions 14a, 14b are depicted in FIG. 2, a greater number of segments could be utilised as desired. The hemicylindrical portions 14a, 14b could be held in place by a fastening arrangement. The fastening arrangement could simply comprise straps placed around the tube 14 and tightened to hold it in place on the cable 12. If desired, a suitable adhesive could be placed at joint 16 to help hold the portions 14a, 14b in place.

Figure 3:
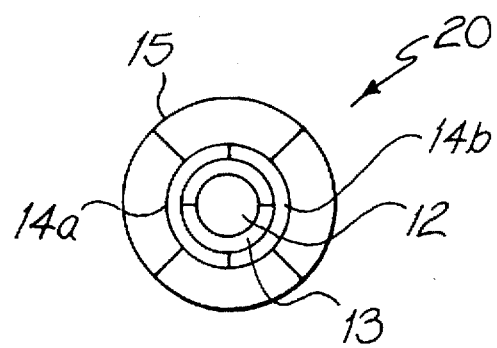
FIG. 3 is a horizontal cross-sectional view of a second embodiment of an acoustic transducer according to the present invention.

An alternative embodiment of the invention is generally depicted as 20 in FIG. 3. In this embodiment, the strain shielding element 13 and the overmold 15 are also comprised of longitudinal segments. Such an arrangement serves to allow the strain shielding element 13, the piezoelectric tube 14 and overmold 15 to be all readily attached to the cable 12 during manufacture without the need to slide the components along the cable 12 to the desired position. Such an arrangement also facilitates replacement or repair of an individual transducer 20 as segments may be removed without the need of having to slide the entire transducer 20 along the cable 12.

The segments constituting the strain shielding element 13 and the overmold 15 could also be held in place by suitable fasteners and adhesives as is described above for the piezoelectric tube 14.

Figure 6:
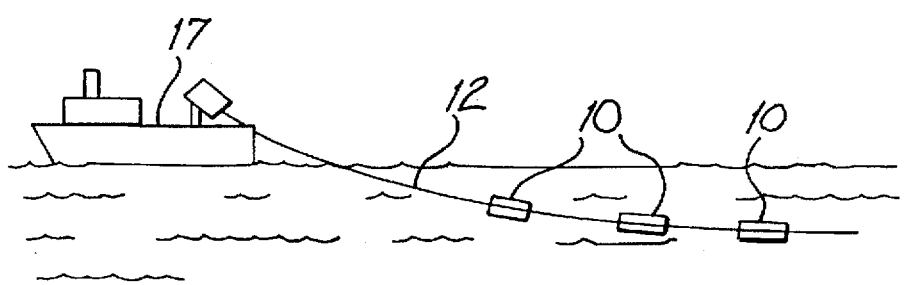
FIG. 6 is an illustrative depiction of a towed array of acoustic transducers, not to scale.

The piezoelectric tube 14 can be fabricated from any suitable piezoelectric material. Suitable materials include ceramic materials (such as barium titanate and lead zirconate titanate (PZT)) and plastics materials (such as PVDF) and piezo-rubber composites. The inner and outer face of each hemicylindrical portion 14a, 14b may be metallized providing electrodes for the piezoelectric material. The electrodes can also be formed from electrically conductive polymers. Electrical connection to the electrodes would be provided by suitable leads known in the art connected to the electrodes. These leads would in turn be interconnected to data bearers in the cable 12 that allow transmission of signals generated by the piezoelectric tube 14 to standard processing and data analysis equipment located in the vessel towing the cable. Such as arrangement is depicted in FIG. 6, where an array of transducers 10 is periodically spaced along a cable 12 extending from a vessel 17. The array could extend over two kilometers from the stern of the vessel 17. The placement of the transducers along the array can also be logarithmic, random, or other staggered non-periodic spacings.

Figure 4:
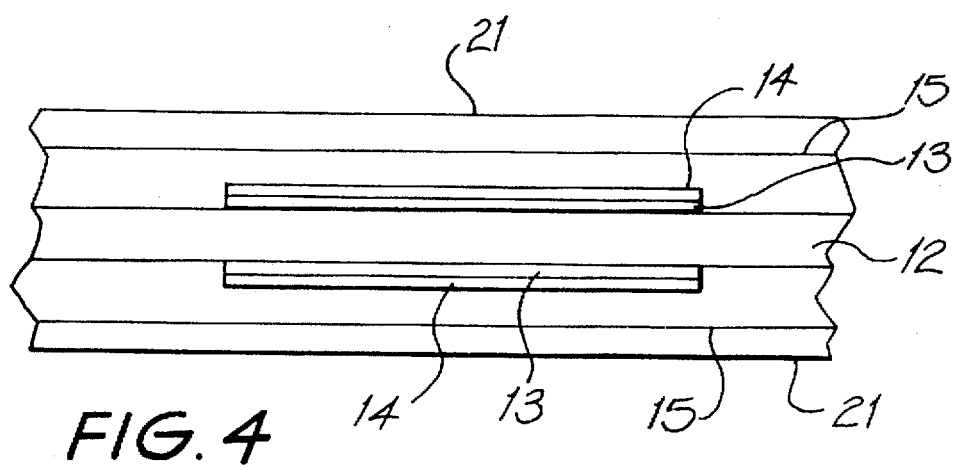
FIG. 4 is another vertical cross-sectional view of the embodiment of the transducer depicted in FIG. 1 with an outer housing of constant diameter.
Figure 5:
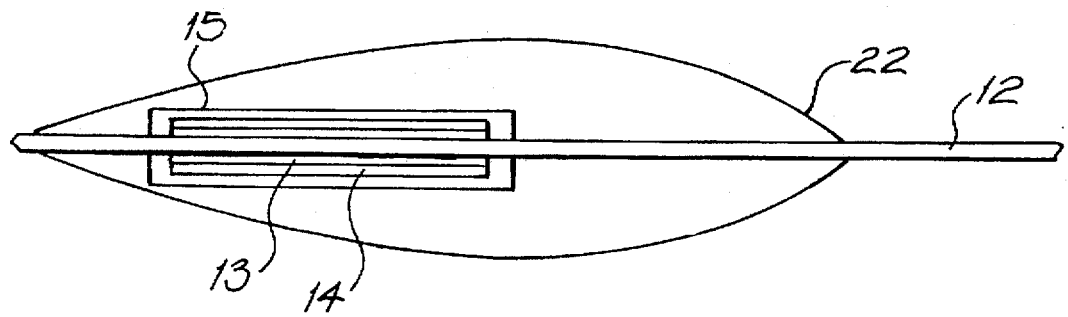
FIG. 5 is a vertical cross-sectional view of the embodiment of the transducer depicted in FIG. 1 with an outer housing of a non-constant diameter hydrodynamically smooth shape.

In the embodiment depicted in FIG. 4, the transducer 10 is shown surrounded by a jacket of positively buoyant plastics composite material 21 that also serves to further waterproof and protect the transducer 10. An alternative arrangement is depicted in FIG. 5, where the transducer 10 is encased in an external housing 22 that is externally hydrodynamically smooth so as to reduce noise generated by turbulence near the hydrophone.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

We claim:

1. An acoustic transducer comprising a tube having a longitudinal axis, the tube being sectioned longitudinally into longitudinal segments, means for fixing said longitudinal segments together to form said tube, and the longitudinal segments being comprised at least in part of a piezoelectric material.

2. The acoustic transducer of claim 1 wherein the tube is cylindrical.

3. An acoustic transducer comprising a tube having a longitudinal axis, the tube being sectioned longitudinally into two hemicylindrical segments, means for fixing said two hemicylindrical segments together to form said tube, and said two hemicylindrical segments being comprised at least in part of a piezoelectric material.

4. The acoustic transducer of claim 1 wherein the tube is elliptical in cross-section.

5. The acoustic transducer of claim 1 wherein the piezoelectric material comprises a plurality of piezoelectric polymer films.

6. The acoustic transducer of claim 1 wherein the piezoelectric material is polyvinylidene flouride (PVDF).

7. The acoustic transducer of claim 5 wherein the piezoelectric material is a piezo-rubber composite.

8. The acoustic transducer of claim 1 wherein each of said longitudinal segments has an inner and outer face, both the inner and outer faces being covered at least in part by an electrically conductive material providing, respectively, an inner and outer electrode.

9. The acoustic transducer of claim 8 wherein at least one of the inner and outer electrodes comprises a metal.

10. The acoustic transducer of claim 8 wherein at least one of the inner and outer electrodes comprises an electrically conductive polymer.

11. The acoustic transducer of claim 8 wherein the respective inner electrodes are electrically connected together and the respective outer electrodes are electrically connected together.

12. The acoustic transducer of claim 8 wherein the longitudinal segments are in an abutting arrangement.

13. A hydrophone array comprising a cable having a plurality of acoustic transducers according to claim 1 connected thereto.

14. The hydrophone array of claim 13 wherein the acoustic transducers are mounted symmetrically around the cable.

15. The hydrophone array of claim 13 wherein the array is a towed array.

16. A hydrophone array comprising:

a cable;

acoustic transducers mounted on said cable;

each of said acoustic transducers comprising a tube having a longitudinal axis, the tube being sectioned longitudinally into longitudinal segments, means for fixing said longitudinal segments together to form said tube around said cable, and the longitudinal segments being comprised at least in part of a piezoelectric material; and a strain shielding element interposed between the cable and each for said acoustic transducers for substantially shielding each of the acoustic transducers from stresses generated in the cable.

17. The hydrophone array of claim 16 wherein the piezoelectric material is an active polarized piezoelectric ceramic material.

18. The hydrophone array of claim 17 wherein the active polarized piezoelectric ceramic material is barium titanate.

19. The hydrophone array of claim 17 wherein the active polarized piezoelectric ceramic material is lead zirconate titanate (PZT).

20. The hydrophone array of claim 16 wherein said strain shielding element comprises a cylindrical member that fits snugly around the cable.

21. A hydrophone array comprising:

a cable;

acoustic transducers mounted on said cable;

each of said acoustic transducers comprising a tube having a longitudinal axis, the tube being sectioned longitudinally into longitudinal segments, means for fixing said longitudinal segments together to form said tube around said cable, and the longitudinal segments being comprised at least in part of a piezoelectric material;

a strain shielding element interposed between the cable and each of said acoustic transducers for substantially shielding each of the acoustic transducers from stresses generated in the cable; and each of said strain shielding elements including longitudinal segments for assembling around said cable.

22. The hydrophone array of claim 16 wherein the strain shielding element is fabricated from a stiff material.

23. The hydrophone array of claim 22 wherein the stiff material is carbon fiber.

24. The hydrophone array of claim 13 wherein the acoustic transducers are held to the cable by said means for fixing and said means for fixing include fasteners that wrap around the tube.

25. The hydrophone array of claim 13 wherein each of said acoustic transducers are surrounded by a housing having a hydrodynamic shape.

26. The hydrophone array of claim 13 wherein the acoustic transducers are encased in an outer housing that waterproofs and protects the acoustic transducers.

27. The hydrophone array of claim 26 wherein the outer housing is fabricated from polyvinyl chloride (PVC).

28. The hydrophone array of claim 26 wherein the outer housing is fabricated from polyurethane.

29. The acoustic transducer of claim 1 wherein the piezoelectric material is a piezo-rubber composite.

* * * * *